United States Patent
An et al.

(10) Patent No.: US 9,123,460 B2
(45) Date of Patent: Sep. 1, 2015

(54) FERRITE COMPOSITION FOR HIGH FREQUENCY BEAD AND CHIP BEAD COMPRISING THE SAME

(75) Inventors: Sung Yong An, Gyeonggi-do (KR); Jin Woo Hahn, Gyeonggi-do (KR); Jeong Wook Kim, Busan (KR); Sung Lyoung Kim, Gyeonggi-do (KR); So Yeon Song, Gyeonggi-do (KR); Soo Hwan Son, Seoul (KR); Ic Seob Kim, Gyeonggi-do (KR)

(73) Assignee: SAMSUNG ELECTRO-MECHANICS CO., LTD., Suwon-Si, Gyeonggi-Do (KR)

( * ) Notice: Subject to any disclaimer, the term of this patent is extended or adjusted under 35 U.S.C. 154(b) by 942 days.

(21) Appl. No.: 13/251,720

(22) Filed: Oct. 3, 2011

(65) Prior Publication Data
US 2012/0085963 A1    Apr. 12, 2012

(30) Foreign Application Priority Data
Oct. 8, 2010   (KR) .................. 10-2010-0098275

(51) Int. Cl.
*C04B 35/26* (2006.01)
*C04B 35/64* (2006.01)
(Continued)

(52) U.S. Cl.
CPC .............. *H01F 1/10* (2013.01); *C01G 49/009* (2013.01); *C01G 49/0018* (2013.01); *C04B 35/265* (2013.01); *C04B 35/2633* (2013.01);
(Continued)

(58) Field of Classification Search
CPC ... C01G 49/0036; C01G 49/0063; H01F 1/10
USPC ....................................................... 252/62.63
See application file for complete search history.

(56) References Cited

U.S. PATENT DOCUMENTS 4,025,449 A  *  5/1977  Pezzoli et al. ............. 252/62.63
4,462,889 A  *  7/1984  Landon et al. ................ 204/292
(Continued)

FOREIGN PATENT DOCUMENTS

JP    2003-146739    5/2003

OTHER PUBLICATIONS

Haijun. Complex permittivity, permeability, and microwave absorption of Zn- and Ti-substituted barium ferrite by citrate sol-gel process. Materials Science and Engineering: B vol. 96, Issue 3, Dec. 1, 2002, pp. 289-295.*

(Continued)

*Primary Examiner* — Matthew E Hoban
(74) *Attorney, Agent, or Firm* — McDermott Will & Emery LLP

(57) ABSTRACT

Disclosed herein are a ferrite composition for a high frequency bead in that a part of Fe in M-type hexagonal ferrite represented by $BaFe_{12}O_{19}$ is substituted with at least one metal selected from a group consisting of 2-valence, 3-valence and 4-valence metals, as well as a chip bead material using the same.

According to embodiments of the present invention, the dielectric composition is characterized in that a part of Fe as a constituent of M-type hexagonal barium ferrite is substituted by other metals, to thus decrease a sintering temperature to 920° C. or less without using any additive for low temperature sintering. Moreover, because of high SRF properties, the inventive composition is applicable to a multilayer type chip bead used at a high frequency of more than several hundreds MHz and a magnetic antenna.

4 Claims, 2 Drawing Sheets

(51) Int. Cl.
*H01F 1/00* (2006.01)
*H01F 1/10* (2006.01)
*C01G 49/00* (2006.01)

(52) U.S. Cl.
CPC ......... *C01P2002/52* (2013.01); *C01P 2006/42* (2013.01); *C04B 2235/3206* (2013.01); *C04B 2235/3215* (2013.01); *C04B 2235/3217* (2013.01); *C04B 2235/3224* (2013.01); *C04B 2235/3229* (2013.01); *C04B 2235/3232* (2013.01); *C04B 2235/3239* (2013.01); *C04B 2235/3244* (2013.01); *C04B 2235/3262* (2013.01); *C04B 2235/3275* (2013.01); *C04B 2235/3279* (2013.01); *C04B 2235/3281* (2013.01); *C04B 2235/3284* (2013.01); *C04B 2235/3286* (2013.01); *C04B 2235/3289* (2013.01); *C04B 2235/3293* (2013.01); *C04B 2235/767* (2013.01); *C04B 2235/77* (2013.01)

(56) References Cited

U.S. PATENT DOCUMENTS

| | | | | |
|---|---|---|---|---|
| 4,770,933 | A | * | 9/1988 | Kitahata et al. ............... 428/323 |
| 5,055,322 | A | * | 10/1991 | Yamamoto .................... 427/128 |
| 5,104,750 | A | * | 4/1992 | Kubo et al. ................. 428/842.8 |

OTHER PUBLICATIONS

Shepherd. Magnetic and structural properties of M-type barium hexaferrite prepared by co-precipitation . Journ. Magnetism and Magnetic Materials 311 (2007) 683-692.*

Lisjak. Synthesis and characterization of A—Sn-substituted (A=Zn, Ni, Co) BaM-hexaferrite powders and ceramics. Journal of the European Ceramic Society 24 (2004) 1841-1845.*

Slama. Magnetic properties of Me-Zr substituted Ba-hexaferrite. Journal of Magnetism and Magnetic Materials 272-276 (2004) 385-387.*

Haneda. Intrinsic Coercivity of Substituted BaFe12O19. Jap J of App Phys 12, 3 1973.*

Tang. Structure and electromagnetic behavior of BaFe12-2x(Ni0.8Ti0.7)xO19-0.8x in the 2-12 GHz frequency range. Journal of Alloys and Compounds 477 (2009) 488-492.*

Y. Li et al., "Synthesis and characterization of nanocrystalline BaFe9.6Co0.8Ti0.8M0.8O19 particles," Materials Chemistry and Physics 64 (2000) 256-259.

C. Wang et al., "Microstructures and high-frequency magnetic properties of low-temperature sintered Co—Ti subsituted barium ferrites," J. of Magnetism and Magnetic Materials 257 (2003) 100-106.

Office Action issued in Korean Patent Application No. 10-2010-0098275 dated Apr. 25, 2012.

* cited by examiner

SRF (SELF-RESONANCE FREQUENCY)

$$SRF = \frac{1}{2\pi\sqrt{LC_p}}$$

FERRITE COMPOSITION FOR HIGH FREQUENCY BEAD AND CHIP BEAD COMPRISING THE SAME

CROSS REFERENCE(S) TO RELATED APPLICATIONS

This application claims the benefit under 35 U.S.C. Section 119 of Korean Patent Application Serial No. 10-2010-0098275, entitled "Ferrite Composition For High Frequency Bead And Chip Bead Comprising The Same" filed on Oct. 8, 2010, which is hereby incorporated by reference in its entirety into this application.

BACKGROUND OF THE INVENTION

1. Technical Field

The present invention relates to a ferrite composition for high frequency beads and a chip bead comprising the same and, more particularly, to a ferrite composition for a high frequency bead, which may be sintered without using any additive for low temperature sintering and be applicable at bandwidths of several hundreds MHz, and a chip bead comprising the same.

2. Description of the Related Art

In general, a magnetic ceramic component such as a multilayer type chip bead is mostly formed using magnetic materials such as nickel-zinc ferrite, nickel-zinc-copper ferrite, or the like. In order to increase sintering properties of the nickel-zinc ferrite, Cu is mostly added thereto, to prepare a three-component system composed of nickel-zinc-copper ferrite. Other than major ingredients of the three-component system, a sintering auxiliary agent such as $Bi_2O_3$ or a low melting point glass may be added. Alternatively, adding $SnO_2$, $Mn_3O_4$, etc., may control characteristics of the ferrite.

The NiZnCu ferrite described above has a cubic spinel structure and is prepared by altering contents of NiO, ZnO, CuO and/or $Fe_2O_3$. A material having low permeability may be more utilized in the range of relatively high frequency bandwidths.

The following FIG. 1 shows a graph of relationship between permeability and frequency and, from this, it can be seen that the high permeability material is useable in the low frequency bandwidth, as compared to materials having low permeability.

Snoek's law may be expressed by the following Equation 1 and the NiZnCu ferrite entails a problem of non-use in a relatively higher frequency bandwidth due to restricted frequency properties caused by limits according to Snoek's law.

$$fr = \frac{|\gamma|M_S}{3\pi(\mu_i - 1)} \quad \text{[Equation 1]}$$

Wherein fr denotes a self-driven resonance frequency, r is a magnetic constant, ui is an initial permeability, and Ms is a saturated magnetization value.

Accordingly, although the demand of chip parts capable of being used at relatively high frequencies is increased with the development of electronic instruments, NiZnCu ferrite generally used in the related art cannot be utilized due to limits according to Snoek's law. Therefore, there is a need for a solution to overcome such limitations as described above.

Furthermore, with regard to the fabrication of a multilayer type chip device using a ferrite composition in a bandwidth of several hundreds MHz, the multilayer type chip bead described above uses an internal electrode mostly comprising of silver (Ag). Since Ag has a melting point of 961° C., a ferrite composition calcined at a temperature of 961° C. or less may be required in order to form a chip. A material capable of being calcined at an appropriate calcination temperature of 920° C. or less, may be preferable.

Meanwhile, among materials overcoming limitations according to Snoek's law, a hexagonal type barium ferrite is known. Barium ferrite may include M, W, Y, Z-type ferrites depending upon contents of constitutional components. In particular, M-type has a chemical formula of $BaFe_{12}O_{19}$ and, likewise, W-type, Y-type and Z-type may have chemical formulae of $BaMe_2Fe_{16}O_{27}$, $Ba_2Me_2Fe_{12}O_{22}$ and $Ba_3Me_2Fe_{24}O_{41}$ (Me=Co, NI, Zn, Cu and Mn), respectively.

With regard to the foregoing chemical formulae, it is known that the ferrite encounters more significant difficulties in preparation, as a chemical content of oxygen is increased. In case of M-type, the ferrite possesses ferromagnetic properties with high magnetic coercive force ('coercivity')(that is, hard ferrite), thus generally being used as a permanent magnet. However, it is known that the above ferrite is not being applied in chip beads due to ferromagnetic properties.

Among the foregoing, W, Y and Z-types show soft ferrite properties and, therefore, may be applicable at a high frequency bandwidth. However, since all of the M, W, Y and Z-types are substantially synthesized at 1200° C. or more, these are not suitable to use as a multilayer type chip bead material.

Next, FIG. 2 shows inductance values versus frequencies. An applicable region, in which the ferrite can be used as chip beads, is present at a frequency bandwidth in a flat area ahead of the self-resonance frequency (SRF). In order to allow the ferrite to be used (as chip beads) at a higher frequency, it is preferable to move SRF toward the high frequency side.

SUMMARY OF THE INVENTION

An object of the present invention is to provide a ferrite composition for a high frequency bead, capable of being sintered at a temperature of 920° C. or less and usable for a high frequency multilayer type chip bead.

Another object of the present invention is to provide a high frequency multilayer type chip bead using the ferrite composition described above.

In order to solve the problems described above, there is provided a ferrite composition for a high frequency bead, characterized in that Fe in M-type hexagonal ferrite represented by $BaFe_{12}O_{19}$ is partially substituted by at least one metal selected from a group consisting of bi(2)-valence, tri(3)-valance and tetra(4)-valence metals.

According to one embodiment of the present invention, the composition may include 12 moles of Fe as well as 2-, 3-, and 4-valence metals as a substituent of Fe per 1 mole of Ba.

According to one embodiment of the present invention, the composition may include 8.0 to 10.5 moles of Fe, 0.05 to 4 moles of 2-valence metal, 0.05 to 2.0 moles of 3-valence metal, and 0.05 to 4.0 moles of 4-valence metal per 1 mole of Ba.

The 2-valence metal may be at least one selected from a group consisting of Zn, Cu, Ni, Co, Mg or Mn, without being particularly limited thereto.

The 3-valence metal may be at least one selected from a group consisting of V, Ga, Al, In or Sc, without being particularly limited thereto.

The 4-valence metal may be at least one selected from a group consisting of Ti, Sn, Zr, Hf, Ce or Ru, without being particularly limited thereto.

The ferrite composition may be a substance sintered at a temperature of 920° C. or less.

In order to solve other objects, the present invention may provide a high frequency chip bead material comprising the ferrite composition described above.

In order to solve further objects, the present invention may provide a toroidal core comprising the ferrite composition described above.

DESCRIPTION OF THE PREFERRED EMBODIMENTS

Figure 1:
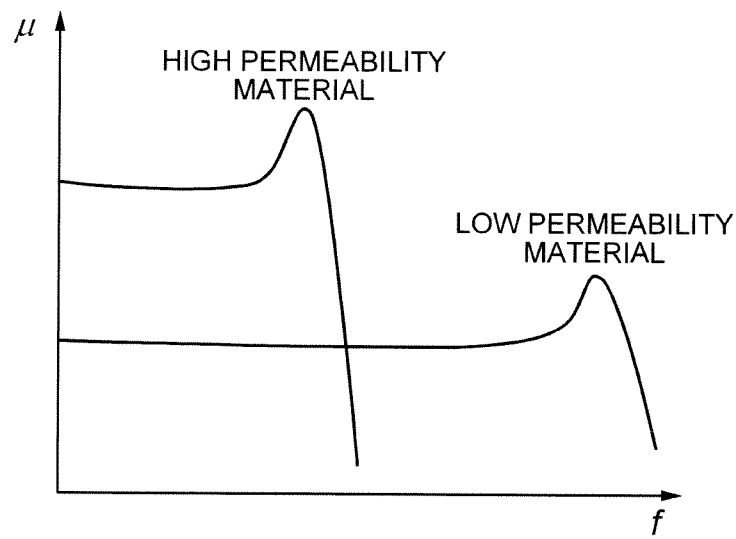
FIG. 1 is a graph showing a relationship between permeability along with frequency.
Figure 2:
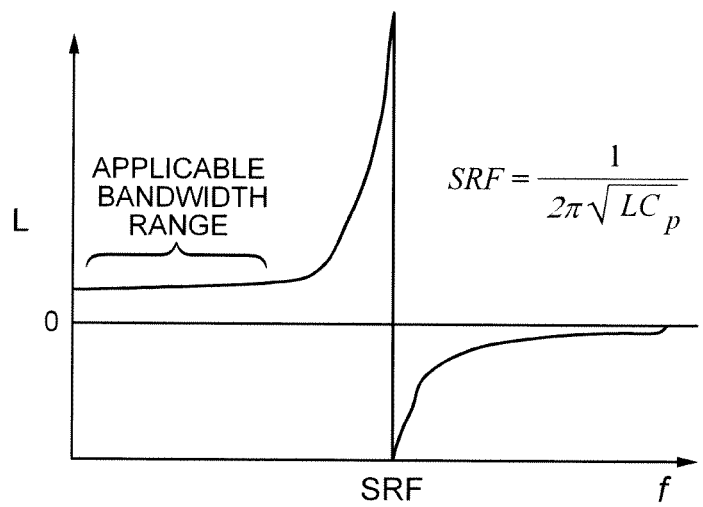
FIG. 2 is a graph of inductance versus frequency.

Hereinafter, the present invention will be described in detail.

The terminology used herein is for the purpose of describing particular embodiments only and is not intended to be limiting of exemplified embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The present invention relates to a ferrite composition used for a high frequency multilayer type chip bead.

The ferrite composition of the present invention is M-type hexagonal ferrite represented by $BaFe_{12}O_{19}$, wherein Fe metals may be substituted by at least one metal selected from a group consisting of 2-valence, 3-valence and 4-valence metals.

In the M-type hexagonal ferrite represented by $BaFe_{12}O_{19}$, a principal content ratio is $BaO:Fe_2O_3=1:6$ moles (since Fe is a 2-valence metal, substantially 1:12), a part of $Fe_2O_3$ is substituted by other metal elements and, even if this is substituted by other metal elements, Ba:(Fe+Fe substituting metal) is principally maintained in a ratio by moles of 1:6.

That is, the principal content ratio is 1 mole of Ba corresponding to 12 moles of Fe and a part of the 12 moles of Fe is substituted by at least one metal selected from a group consisting of 2-valence, 3-valence and 4-valence metals.

More particularly, 8.0 to 10.5 moles of Fe, 0.05 to 4 moles of 2-valence metal, 0.05 to 2.0 moles of 3-valence metal, and 0.05 to 4.0 moles of 4-valence metal per 1 mole of Ba, may be included.

The 2-valence metal substituting Fe may be at least one selected from a group consisting of Zn, Cu, Ni, Co, Mg or Mn, without being particularly limited thereto.

The 3-valence metal substituting Fe may be at least one selected from a group consisting of V, Ga, Al, In or Sc, without being particularly limited thereto.

The 4-valence metal substituting Fe may be at least one selected from a group consisting of Ti, Sn, Zr, Hf, Ce or Ru, without being particularly limited thereto.

The metal may be included as a metal salt in the composition, and such a salt may be selected from a group consisting of oxide, nitrate, hydroxide, chloride, carbonate or acetate, without being particularly limited thereto.

The inventive composition composed with the foregoing content ratios may have a characteristic in that it can be calcined at a temperature of 920° C. or less.

In general, a multilayer type chip bead mostly uses Ag as an internal electrode and, since a melting point of Ag is 961° C., a lower calcination temperature than the melting point of Ag is required to realize (that is, form) a chip. According to the related art, in order to produce a dielectric composition satisfying the above conditions, a low temperature sintering additive such as glass, $Bi_2O_3$, etc., must be added.

However, the present invention partially substitutes Fe metal in the M-type hexagonal barium ferrite composition with other metals, to thus enable sintering at a low temperature of 920° C. or less even without any low temperature sintering additives.

The following description will be given to explain a method for preparation of a ferrite composition according to the present invention. First, respective raw materials are weighed to desired contents, wherein the raw materials may be salts of respective metals described above, and types thereof are not particularly limited. Next, the raw materials are dried in a dry oven, after liquid-phase milling. After grinding the dried powder, the powder is calcined at 700 to 800° C. wherein the calcination temperature may be set to a temperature at which an M-type ferrite single phase is created without formation of a hematite ($\alpha$-$Fe_2O_3$) as a secondary phase. The calcined powder is ground through milling, resulting in a final product, that is, ferrite powder.

The M-type hexagonal barium ferrite powder according to the present invention may be prepared by a solid-phase method or liquid-phase method known in the related art, without being particularly limited thereto.

Meanwhile, the present invention is also characterized by providing a multilayer type chip bead comprising the ferrite composition described above.

For a toroidal core formed by sintering the ferrite composition at a temperature of 920° C. or less, it can be seen that SRF is very high to be around 500 MHz. Since SRF characteristics are improved, an applicable frequency bandwidth may be considered to be increased up to a bandwidth of several hundreds MHz.

Accordingly, the inventive ferrite composition may be applicable to a multilayer type chip bead, which is used to remove noise in a wide range, that is, from low frequencies to high frequencies.

Moreover, the inventive ferrite composition may be applicable to a magnetic antenna.

Preferred embodiments of the present invention will be provided to thoroughly and completely explain the present invention to those skilled in the related art. Various modifications of such embodiments may be possible and the scope of the present invention is not restricted thereto. Rather, these embodiments of the present invention will be provided so that this disclosure will be thorough and complete, and will fully convey the scope of the present invention to those skilled in the art.

EXAMPLE

First, respective raw materials to be included in a ferrite composition were prepared. As such raw materials, $BaCO_3$ (or BaO), $Fe_2O_3$, ZnO, CuO, $V_2O_5$ and $TiO_2$ were respectively prepared and then weighed. Then, after liquid-phase milling the materials, the milled materials were dried in a dry oven. After grinding the dried powder, it was calcined at 700 to 800° C. to obtain an M-type ferrite single phase. The calcined powder was ground through milling, resulting in a final ferrite powder.

Here, the prepared M-type hexagonal ferrite composition has contained 1 mole of Ba, 8.0 to 10.5 moles of Fe, 0.05 to 2.0 moles of Zn, 0.05 to 2.0 moles of CuO, 0.05 to 2.0 moles of Ti, and 0.05 to 2.0 moles of V and, more particularly, was expressed by $BaFe_8CuTiVZnO_{19}$.

COMPARATIVE EXAMPLE

A NiZnCu ferrite composition known in the related art, comprising of, in terms of mole %, $Fe_2O_3$: 49.0%, NiO: 18.0%, ZnO: 22.0%, and CuO: 11.0%, was used in a comparative example.

EXPERIMENTAL EXAMPLE 1

Measurement of Inductance Along with Frequency

Figure 3:
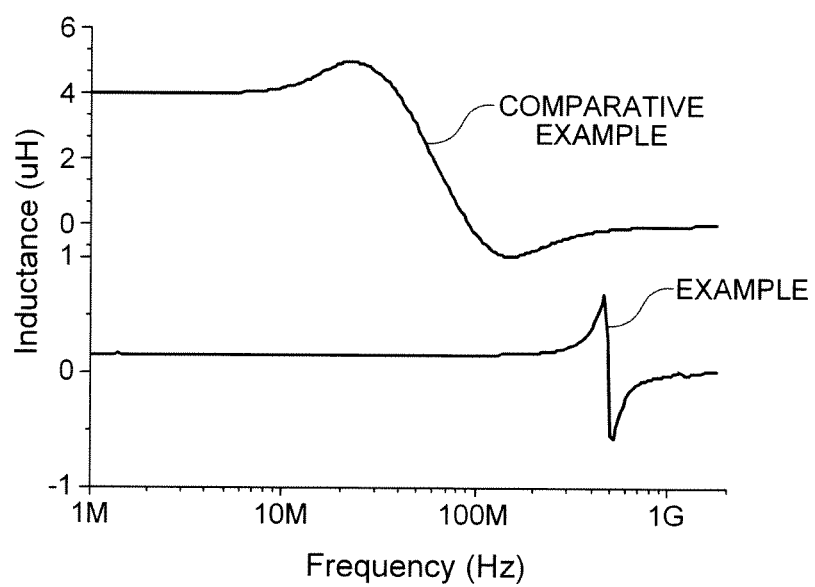

For the M-type ferrite prepared in the example as well as the existing NiZnCu ferrite, inductance values versus frequencies were measured and shown in FIG. 3.

It was confirmed that the NiZnCu ferrite according to the comparative example had SRF of 100 MHz or less and an applicable bandwidth of 10 MHz or less while the M-type ferrite of Example 1 according to the present invention (a toroidal core specimen calcined at 920° C.) had SRF present around 500 MHz and an applicable bandwidth of several hundreds MHz.

Therefore, the inventive ferrite composition may be applicable to a multilayer type chip bead used to remove noise at a bandwidth ranging from low frequencies to high frequencies. In addition, the hexagonal ferrite of the present invention may be applicable to a magnetic antenna.

EXPERIMENTAL EXAMPLE 2

Measurement of Permeability, Quality Constant and Density

After weighing the ferrite composition powder of the present invention to 2.5 g, polyvinyl alcohol (PVA) was added in an amount of 0.5 wt % relative to the ferrite powder, followed by formation of a toroidal core. The formed core specimen was calcined at 920° C. in air. Density of the calcined toroidal core was measured and, after winding an enamel wire around the toroidal core 10 times, permeability and Q value at 1 MHz were measured using HP4019B impedance analyzer.

In case of calcination at 920° C. with the content ratio described in the inventive example, the permeability was about 6, Q value was about 17, and the density was measured to 4.87 $g/cm^3$.

From the foregoing results, it can be demonstrated that the ferrite composition according to the present invention has reduced permeability enabling the composition to be used at a high frequency bandwidth. Further, the higher Q value becomes more preferable. This fact is because loss is reduced. As a result, excellent results have been confirmed. In order to enable calcination at a low temperature, the density should be at least 4.5 $g/cm^3$ or more and, preferably, 4.8 $g/cm^3$. In this regard, the inventive composition having a density of 4.87 $g/cm^3$ was confirmed to be possibly calcined even at a low temperature of 920° C.

Briefly, was identified that, without using an auxiliary material for low temperature sintering such as glass, $Bi_2O_3$, etc., M-type ferrite composition of the present invention may be calcined at a low temperature (of 920° C. or less).

As set forth above, according to one embodiment of the present invention, a dielectric composition of the present invention is characterized in that a part of Fe as a constituent of M-type hexagonal barium ferrite is substituted by other metals, thereby enabling a decrease in the sintering temperature to 920° C. or less without using any additive for low temperature sintering.

Further, according to one embodiment of the present invention, because of high SRF properties, the inventive composition may be applicable to a multilayer type chip bead used at a high frequency of more than several hundreds MHz, a magnetic antenna, or the like.

While the present invention has been shown and described in connection with the embodiments, it will be apparent to those skilled in the art that modifications and variations can be made without departing from the spirit and scope of the invention as defined by the appended claims.

What is claimed is:

1. A ferrite composition for a high frequency bead, comprising:
   M-type hexagonal ferrite represented by $BaFe_8CuTiVZnO_{19}$.

2. The composition according to claim 1, wherein the ferrite composition is sintered at a temperature of 920° C. or less.

3. A high frequency chip bead, comprising the ferrite composition of claim 1.

4. A toroidal core, comprising the ferrite composition of claim 1.

* * * * *